Sept. 28, 1926. 1,601,267
J. W. SVALGAARD
FISH BAIT
Filed March 18, 1926

J. W. Svalgaard
Inventor,
By C. A. Snow & Co.
Attorneys.

Patented Sept. 28, 1926.

1,601,267

UNITED STATES PATENT OFFICE.

JOHN W. SVALGAARD, OF MINNEAPOLIS, MINNESOTA.

FISH BAIT.

Application filed March 18, 1926. Serial No. 95,717.

The present invention relates to artificial bait employed by fishermen in catching trout, bass or the like and aims to provide novel means whereby the current of the water will act to move the bait simulating movements of a minnow, to attract the attention of fish.

An important object of the invention is to provide a device of this character which will offer resistance in the water and prevent the bait from being pulled too rapidly through the water, when the fish has made what is commonly known as a strike.

A still further object of the invention is to provide a device of this character including a substantially cone-shaped member and a supporting member for supporting the cone-shaped member, the supporting member being pivotally connected with the hooks of the bait in such a way that the cone-shaped portion of the bait may swing independently of the hooks.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing.

Figure 1:
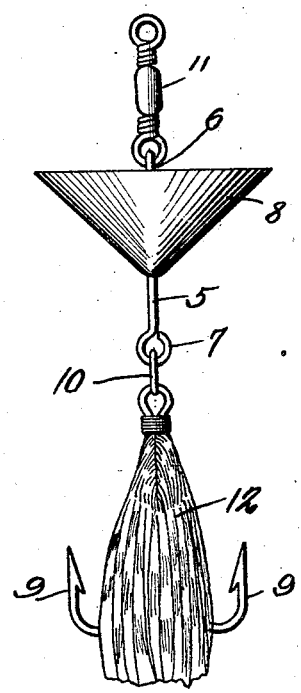
Figure 1 is an elevational view of a fly or artificial bait constructed in accordance with the invention.

Referring to the drawing in detail, the device includes the supporting member 5 which is in the form of a wire bent at its ends to provide eyes 6 and 7 respectively.

Figure 2:
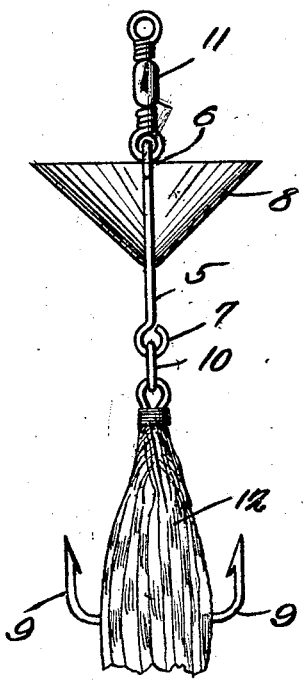
Figure 2 is a vertical sectional view through the cone-shaped member of the device.
Figure 3:
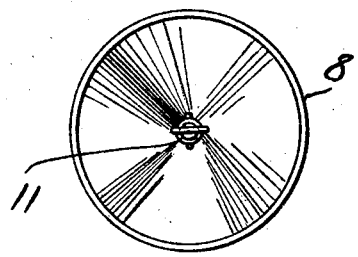
Figure 3 is a plan view of the cone-shaped device.

Secured to the member 5 at a point intermediate its ends is the member 8 which is substantially cone-shaped as further illustrated by Figure 2 and disposed in such a way that the open end of the cone or member 8 will precede the opposite end thereof as it is being drawn through the water with the result that water passing into the cone-shaped member will cause the same to take an irregular course as the device is being drawn through the water during the fishing operation.

The hooks are shown at 9 and are connected with the eye 7 through the medium of the link 10 in such a way that the hook member will be permitted to swing.

The swivel connection 11 has connection with the eye 6 of the member 5 and affords means whereby a fishing line may be secured to the device.

In the use of the device, it is of course obvious that artificial bait of this character is used in running streams wherein the bottom is usually rocky causing the water to take an irregular course, and in view of the fact that the water passes into the cone-shaped member 8 from all sides, it will be obvious that the cone-shaped member is constantly being moved in various directions causing the bait which is in the form of bright colored feathers, to take movements through the water simulating a minnow, to attract the fish.

I claim:

1. Artificial bait including a supporting member, a cone-shaped member having its flared end disposed in the direction of travel of the bait when pulled through the water, and hook members connected with the supporting member.

2. Artificial bait including a supporting member in the form of a length of wire having eyes formed at its ends, a substantially cone-shaped member, secured to the supporting member at a point intermediate the ends of the supporting member, hook members pivotally connected with the supporting member, and a swivel connected with the supporting member adjacent to the flared end of the cone-shaped member.

3. An artificial bait including a supporting member, a hollow member secured to the supporting member and having its open end disposed in the direction of travel of the bait when pulled through the water, and hook members connected with the supporting member.

In testimony that I claim the foregoing as my own, I have hereto affixed my signature.

JOHN W. SVALGAARD.